United States Patent [19]

Saito et al.

[11] Patent Number: 5,492,101

[45] Date of Patent: Feb. 20, 1996

[54] FUEL INJECTION CONTROL APPARATUS FOR AN INTERNAL COMBUSTION ENGINE

[75] Inventors: Kimitaka Saito, Nagoya; Tetsuya Morino, Okazaki; Keiso Takeda, Mishima, all of Japan

[73] Assignees: Nippon Soken, Inc.; Toyota Jidosha Kabushiki Kaisha, both of Japan

[21] Appl. No.: 354,798

[22] Filed: Dec. 12, 1994

[30] Foreign Application Priority Data

Dec. 13, 1993 [JP] Japan .................. 5-312260

[51] Int. Cl.⁶ ............................................. F02D 41/04
[52] U.S. Cl. ........................................ 123/491; 123/480
[58] Field of Search ................................ 123/478, 480, 123/491, 492, 493

[56] References Cited

U.S. PATENT DOCUMENTS

| | | | |
|---|---|---|---|
| 4,357,923 | 11/1982 | Hideg | 123/492 |
| 4,388,906 | 6/1983 | Sugiyama et al. | 123/492 |
| 4,903,668 | 2/1990 | Ohata | 123/480 X |
| 5,390,641 | 2/1995 | Yamada et al. | 123/480 X |

FOREIGN PATENT DOCUMENTS 4-153535  5/1992  Japan .

Primary Examiner—Tony M. Argenbright
Attorney, Agent, or Firm—Cushman Darby & Cushman

[57] ABSTRACT

A fuel injection valve 15 is disposed in an intake passage 9 of an engine body 1. A combustion chamber 5 communicates with the intake passage 9 for introducing fuel injected from the fuel injection valve 15 at predetermined intake timings. A plurality of sensors are provided in the engine body 1 or fuel intake system for detecting various engine operational conditions including properties of fuel. A control unit 30 calculates a fuel quantity-of-state in the combustion chamber 5 in accordance with the engine operational conditions detected by the sensors, using an atomized fuel behavioral model representing behavior of fuel injected from the fuel injection valve 15, an intake passage fuel behavioral model representing fuel behavior in the intake passage 9 and a combustion chamber fuel behavioral model representing fuel behavior in the combustion chamber 5. Furthermore, the control unit 30 calculates a fuel injection amount required to adjust an actual gaseous air-fuel ratio in the combustion chamber 5 to a desired value in accordance with the fuel quantity-of-state thus calculated. The control unit 30 uses a cranking model as the combustion chamber fuel behavioral model before an initial explosion is detected and uses a firing model after the initial explosion is detected. The fuel injection valve 15 is opened or closed on the basis of the fuel injection amount thus calculated.

14 Claims, 14 Drawing Sheets

FUEL INJECTION CONTROL APPARATUS FOR AN INTERNAL COMBUSTION ENGINE

BACKGROUND OF THE INVENTION

1. Field of the Invention

The present invention relates to a fuel injection control apparatus for an internal combustion engine, and more particularly to a fuel injection control apparatus preferably used in a fuel injection type internal combustion engine equipped with a fuel injection valve supplying atomized liquid fuel such as gasoline from an injection nozzle thereof.

2. Prior Art

A fuel injection method, injecting atomized liquid fuel such as gasoline into an intake passage of an internal combustion engine, has useful and excellent capability of accurately controlling the fuel supply amount in accordance with driving or operational conditions of the internal combustion engine, thereby adjusting the fuel supply amount to a value optimizing output power performance or minimizing harmful emission in the exhaust gas of the engine. To realize such an accurate control of the fuel injection amount supplied to an internal combustion engine, some prior art technologies propose to execute the fuel injection taking account of fuel behavior including adhesion of liquid fuel to the wall of an intake passage. (For example, refer to Laid-open Japanese Patent Application No. SHO 56-47638/1981, Laid-open Japanese Patent Application No. SHO 58-8238/1983, and Laid-open Japanese Patent Application No. HEI 4-153535/1992).

FIGS. 19A through 19D illustrate typical behavior of fuel in a low-temperature engine starting condition, wherein fuel is first injected from an injection valve into an intake passage and then flows into a combustion chamber. FIGS. 19A through 19D are views showing intake, compression, explosion and exhaust strokes of a four-cycle internal combustion engine, respectively. Liquid-state fuel injected from a fuel injection valve 51 into an intake passage 52 is divided into three, a vapor component vaporized immediately after injection, a small particle size liquid component not adhering on the wall of the intake passage 52 and a large particle size liquid component adhering on the wall of the intake passage 52. Both the vapor component and the small particle size liquid component are introduced into a combustion chamber 53 during an intake stroke first taken place after the fuel injection. On the other hand, the large particle size liquid component adhering on the wall of the intake passage 52 remains for a while on the wall without being introduced into the combustion chamber and flows on the wall of the intake passage 52 toward the combustion chamber 53 as liquid film, later entering into the combustion chamber 53 with delay of several strokes.

In short, injected fuel is roughly divided into two, a component introduced into the combustion chamber without delay during an intake stroke immediately after the injection is finished and the other component introduced into the combustion chamber with some delay. A conventional fuel injection control apparatus calculates a fuel injection amount required for obtaining a target air-fuel ratio on the basis of an atomized fuel model representing atomized condition of fuel in the intake passage 52 and a wall flow model representing liquid-film fuel flow along the wall of the intake passage 52.

However, the above conventional fuel injection control apparatus is not perfect in that no consideration is given to the fuel behavior in the combustion chamber 53 after the fuel is once introduced in the combustion chamber 53. Thus, this conventional fuel injection control technology will encounter with a problem of receiving adverse effect of liquid-state fuel residing in the combustion chamber 53, resulting in the failure in the optimization of the engine driving or operational condition.

More specifically, as shown in FIGS. 19A–19D, a combustion chamber of low temperature tends to allow fuel entering from the intake passage 52 to reside as wall wet therein without being vaporized. The wall wet is vaporized to a certain extent in the succeeding compression stroke. Thus vaporized fuel is burnt together with gaseous fuel introduced from the intake passage 52 to the combustion chamber 53 during the preceding intake stroke. Meanwhile, almost all the liquid-state fuel on the wall is not burnt and resides as wall wet.

In short, the above-described conventional fuel injection control apparatus does not take account of adverse effect caused by the fuel entering as wall wet into the combustion chamber 53 and a vaporized component of the fuel residing as wall wet in the combustion chamber 53. Therefore, it was not possible to control an actual gaseous air-fuel ratio (i.e. a weight ratio of air to gaseous fuel) in the combustion chamber 53 to a desired value. Especially, fuel adhering on the wall in the combustion chamber 53 increases its amount with lowering temperature of the engine. Thus, the actual gaseous air-fuel ratio in the combustion chamber 53 is largely deviated from the desired ratio. If the actual gaseous air-fuel ratio in the combustion chamber 53 is too much lean, the start-up of engine will be delayed. On the other hand, if the actual gaseous air-fuel ratio is too much rich, harmful emission components such as HC will increase.

Even if the engine succeeds to start, too much lean air-fuel ratio will later cause a problem of suffering lack of torque when acceleration is required. More specifically, when an amount of wall wet is small in the combustion chamber 53, the actual gaseous air-fuel Patio is maintained within a predetermined range in the combustion chamber 53, thus assuring a firing for combustion. On the contrary, if an amount of wall wet increases in the combustion chamber 53, the actual gaseous air-fuel ratio will be deviated out of the predetermined range, thus inducing failure of firing which results in knocking with deterioration of drivability.

Summary of the Invention

Accordingly, in view of above-described problems encountered in the prior art, a principal object of the present invention is to provide a fuel injection control apparatus for an internal combustion engine capable of accurately controlling the actual gaseous air-fuel ratio in a combustion chamber to improve start-up of the engine or reduce harmful emission, and to realize an excellent drivability.

In order to accomplish this and other related objects, a first aspect of the present invention provides, as shown in FIG. 20, a fuel injection control apparatus for an internal combustion engine comprising: a fuel injection valve M2 disposed in an intake passage M1; a combustion chamber M3 communicated with the intake passage M1 for introducing fuel injected from the fuel injection valve M2 at predetermined intake timings; operational condition detecting means M4 for detecting various operational conditions including properties of fuel; fuel quantity-of-state calculating means M5 for calculating a fuel quantity-of-state in the combustion chamber M3 in accordance with the operational conditions detected by the operational condition detecting means M4, using an atomized fuel behavioral model representing behavior of fuel injected from the fuel injection valve M2, an intake passage fuel behavioral model representing fuel behavior in the intake passage M1 and a combustion chamber fuel behavioral model representing fuel behavior in the combustion chamber M3; injection amount calculating means M8 for calculating a fuel injection amount required to adjust an actual gaseous air-fuel ratio in the combustion chamber M3 to a desired value in accordance with the fuel quantity-of-state calculated by the fuel quantity-of-state calculating means MS; and injection valve actuating means M7 for opening and closing the fuel injection valve M2 on the basis of the fuel injection amount calculated by the injection amount calculating means M6.

A second aspect of the present invention provides, as shown in FIG. 21, a fuel injection control apparatus for an internal combustion engine comprising: a fuel injection valve M12 disposed in a combustion chamber M11 so that fuel is directly injected from the fuel injection valve M12 into the combustion chamber M11; operational condition detecting means M13 for detecting various operational conditions including properties of fuel; fuel quantity-of-state calculating means M14 for calculating a fuel quantity-of-state in the combustion chamber M11 in accordance with the operational conditions detected by the operational condition detecting means M13, using an atomized fuel behavioral model representing behavior of fuel injected from the fuel injection valve M12 and a combustion chamber fuel behavioral model representing fuel behavior in the combustion chamber M11; injection amount calculating means M15 for calculating a fuel injection amount required to adjust an actual gaseous air-fuel ratio in the combustion chamber M11 to a desired value in accordance with the fuel quantity-of-state calculated by the fuel quantity-of-state calculating means M14; and injection valve actuating means M18 for opening and closing the fuel injection valve M12 on the basis of the fuel injection amount calculated by the injection amount calculating means M15.

In the above first or second aspect of the present invention, the combustion chamber fuel behavioral model can include a cranking model representing fuel behavior during a first period from start-up of engine to an initial explosion and a firing model representing fuel behavior during a second period succeeding the first period. The cranking model is selected in the beginning of the engine starting operation, and is switched to the firing model upon detection of the initial explosion.

If leakage of fuel from the fuel injection valve M2 or M12 is detected during a dormant period of the engine, such a leakage amount can be reflected to the determination of an initial value of the cranking model.

The fuel injection control apparatus in accordance with the first aspect of the present invention is chiefly employed in an indirect fuel injection type internal combustion engine which is equipped with a fuel injection valve disposed in an intake passage not in a combustion chamber. According to this apparatus, the operational condition detecting means M4 detects various operational conditions including properties of fuel. The fuel quantity-of-state calculating means M5 calculates a fuel quantity-of-state in the combustion chamber M3 in accordance with the operational conditions detected by the operational condition detecting means M4, using the atomized fuel behavioral model representing behavior of fuel injected from the fuel injection valve M2, the intake passage fuel behavioral model representing fuel behavior in the intake passage M1 and the combustion chamber fuel behavioral model representing fuel behavior in the combustion chamber M3. The injection amount calculating means M6 calculates a fuel injection amount required to adjust an actual gaseous air-fuel ratio in the combustion chamber M3 to a desired value in accordance with the fuel quantity-of-state calculated by the fuel quantity-of-state calculating means M5. And, the injection valve actuating means M7 opens and closes the fuel injection valve M2 on the basis of the fuel injection amount calculated by the injection amount calculating means M6.

In general, adhesion of fuel onto the wall of the intake passage M1 and/or the combustion chamber M3 of the engine and vaporization of such adhering fuel possibly differentiate an actual gaseous fuel amount introduced into the combustion chamber M3 from the fuel amount injected from the fuel injection valve M2, causing a deviation of the actual air-fuel ratio in the combustion chamber M3 from the target value. Especially, quantity of residual fuel forming wall wet in the combustion chamber is larger in the start-up of engine than in an ordinary or long-time driving condition of the engine. Due to such an unstable factor of fuel behavior, the actual air-fuel ratio in the combustion chamber M3 is largely disturbed. Accordingly, the start-up of engine will be deteriorated and emission will be worsened.

However, the first aspect of the present invention has an arrangement for controlling the actual air-fuel ratio in the combustion chamber M3 to the desired value using the combustion chamber fuel behavioral model representing the behavior of fuel residing as wall wet in the combustion chamber M3, in addition to the atomized fuel behavioral model representing behavior of fuel injected from the fuel injection valve M2 and the intake passage fuel behavioral model representing fuel behavior such as vaporization and liquid film flow in the intake passage M1. Accordingly, the actual air-fuel ratio of the combustion chamber M3 is accurately controlled even if the combustion chamber M3 is in a low-temperature condition before and immediately after the start-up of the engine. Thus, the first aspect of the present invention enables the engine to smoothly start up and reduce harmful emission, and further to realize an excellent drivability even in such a low-temperature condition.

On the other hand, the fuel injection control apparatus in accordance with the second aspect of the present invention is chiefly employed in a direct fuel injection type internal combustion engine such as a diesel engine which is equipped with a fuel injection valve disposed in a combustion chamber. According to this apparatus, the operational condition detecting means M13 detects various operational conditions including properties of fuel. The fuel quantity-of-state calculating means M14 calculates a fuel quantity-of-state in the combustion chamber M11 in accordance with the operational conditions detected by the operational condition detecting means M13, using the atomized fuel behavioral model representing behavior of fuel injected from the fuel injection valve M12 and the combustion chamber fuel behavioral model representing fuel behavior in the combustion chamber M11. The injection amount calculating means M15 calculates a fuel injection amount required to adjust an actual gaseous air-fuel ratio in the combustion chamber M11 to a desired value in accordance with the fuel quantity-of-state calculated by the fuel quantity-of-state calculating means M14. And, the injection valve actuating means M16 opens and closes the fuel injection valve M12 on the basis of the fuel injection amount calculated by the injection amount calculating means M15.

According to this second aspect apparatus of the present invention, modeling of fuel behavior is different from the first aspect apparatus in that the intake passage fuel behavioral model is omitted, although substantially the same effect is obtained. Thus, the actual air-fuel ratio of the combustion chamber M11 is accurately controlled even if the combustion chamber M11 is in a low-temperature condition before and immediately after the start-up of the engine. Accordingly, the second aspect of the present invention enables the engine to smoothly start up and reduce harmful emission, and further to realize an excellent drivability even in such a low-temperature condition.

Preferably, the combustion chamber fuel behavioral model includes a cranking model representing fuel behavior during a first period from start-up of engine to an initial explosion and a firing model representing fuel behavior during a second period succeeding the first period. The cranking model is selected in the beginning of the engine starting operation, and is switched to the firing model upon detection of the initial explosion. With this fine setting of the combustion chamber fuel behavioral model, the fuel injection control is accurately controlled in the beginning of the engine starting operation.

In the event of fuel leakage from the fuel injection valve M2 or M12 during a dormant period of engine, it is preferable that such a leakage amount is reflected to the determination of an initial value of the cranking model. Thus, even if the fuel leakage from the injection valve M2 or M12 induces an increase of wall wet amount of residual fuel, the fuel injection control is not adversely affected as a whole because the fuel injection control takes account of such a fuel leakage. Hence, the actual gaseous air-fuel ratio in the combustion chamber M3 or M11 can be surely maintained at the desirable value.

BRIEF DESCRIPTION OF THE DRAWINGS

The above and other objects, features and advantages of the present invention will become more apparent from the following detailed description which is to be read in conjunction with the accompanying drawings, in which:

FIGS. 19A through 19D are cross-sectional views illustrating behavior of fuel in each stroke of a four-cycle internal combustion engine, wherein FIG. 19A shows an intake stroke, FIG. 19B a compression stroke, FIG. 19C an explosion stroke and FIG. 19D exhaust stroke;

DETAILED DESCRIPTION OF THE PREFERRED EMBODIMENTS

Preferred embodiments of the fuel injection control apparatus for an internal combustion engine in accordance with the present invention will be explained in greater detail hereinafter, with reference to the accompanying drawings.

Figure 1:
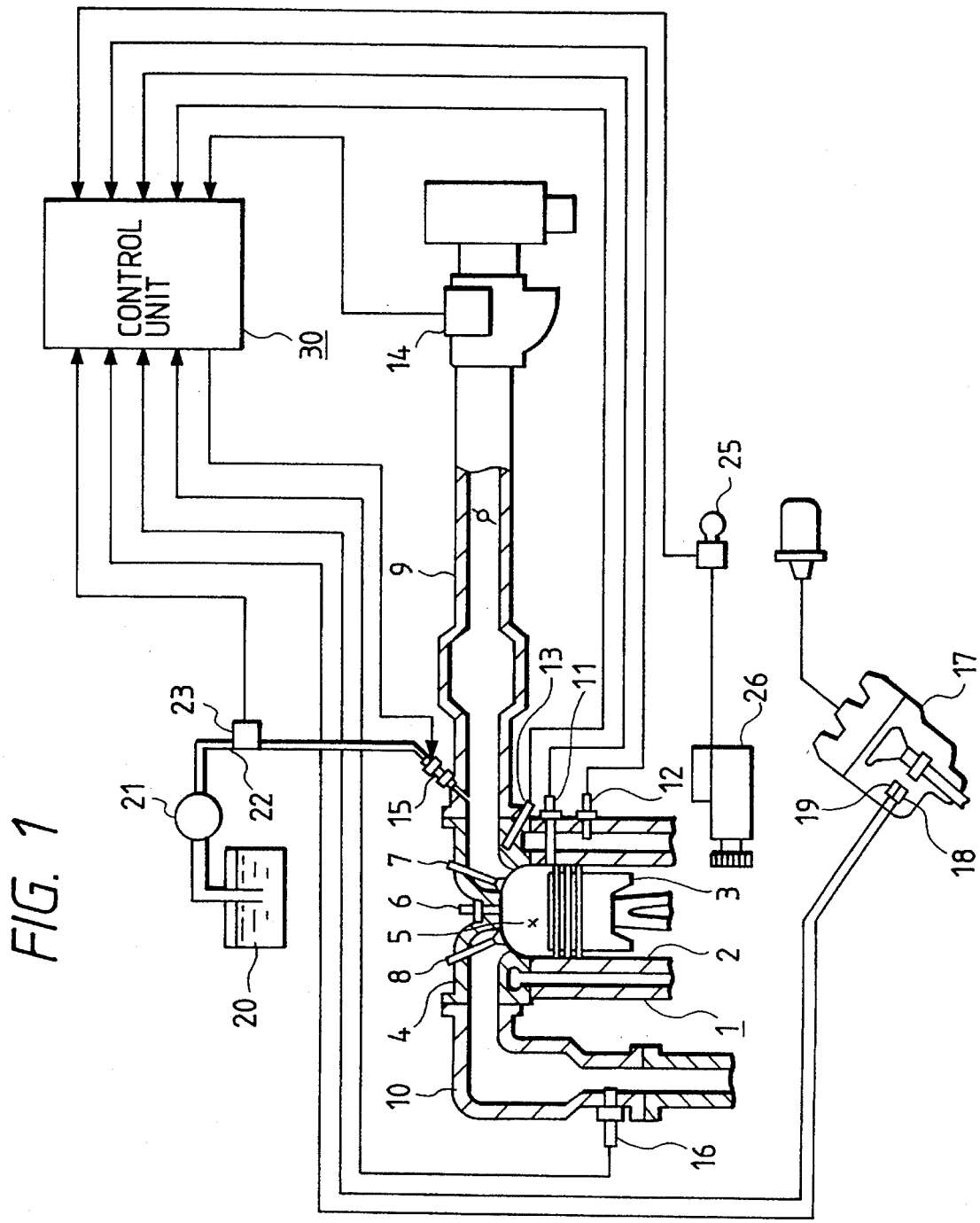
FIG. 1 is a block diagram schematically showing a fuel injection control apparatus in accordance with a preferred embodiment of the present invention.

FIG. 1 is a block diagram schematically showing a fuel injection control apparatus for a multi-cylinder four-cycle internal combustion engine in accordance with a preferred embodiment of the present invention. In FIG. 1, the fuel injection control apparatus includes a control unit 30 which executes the fuel injection control and/or ignition timing control of the internal combustion engine. An engine body 1 includes a cylinder 2 accommodating a piston 3 therein. The piston 3 defines a combustion chamber 5 thereon together with the cylinder 2 and a cylinder head 4. An ignition plug 6 is disposed in the combustion chamber 5. The combustion chamber 5 is communicated with an intake passage 9 and an exhaust passage 10 through an intake valve 7 and an exhaust valve 8, respectively.

The cylinder 2 is equipped with an engine temperature sensor 11 detecting the temperature of the engine body 1 (i.e. an engine temperature $T_E$) and a cooling water temperature sensor 12 detecting the temperature of cooling water circulating in the engine body 1 (i.e. a water temperature $T_W$). The cylinder head 4 is provided, in the vicinity of the intake valve 7, with an intake passage wall temperature sensor 13 detecting the temperature of the wall of the intake passage 9 (i.e. an intake passage wall temperature $T_M$). The engine temperature sensor 11, the cooling water temperature sensor 12 and the intake passage wall temperature sensor 13 are connected to the control unit 30 to supply detected signals to the control unit 30.

An air flow meter (AFM) 14, measuring an intake air amount Q, is provided in the intake passage 9. The air flow meter 14 contains a potentiometer therein to generate an output signal of analog voltage proportional to the intake air amount Q measured. The output signal of the air flow meter 14 is supplied to the control unit 30. The intake passage 9 is also provided with fuel injection valves 15, each corresponding to each cylinder of the engine, from which pressurized fuel from a fuel supply system later described is sprayed into the intake passage 9 to form atomized fuel atmosphere in the intake passage 9. The fuel injection valve 15 is connected to the control unit 30 and is actuated by a control signal supplied from the control unit 30.

The exhaust passage 10 is provided with an $O_2$ sensor 16 generating a voltage signal corresponding to the concentration of oxygen component in the exhaust gas. The $O_2$ sensor 16 is connected to the control unit 30 to supply its output signal to the control unit 30.

A distributor 17 comprises a reference position sensor 18 which generates a reference position detecting pulse signal every 720° rotation of its axis in terms of crank angle (i.e. 720° CA), a crank angle sensor 19 which generates a crank angle detecting pulse signal every 30° rotation of its axis in terms of crank angle (i.e. 30° CA). These sensors 18 and 19 are connected to the control unit 30 to supply their pulse signals to the control unit 30.

The fuel supply system comprises a fuel tank 20 storing fuel such as gasoline, a fuel pump 21 sucking up the fuel from the fuel tank 20 and feeding pressurized fuel to the fuel injection valve 15. A fuel pipe 22, connecting the fuel pump 21 and the fuel injection valve 15, is provided with a fuel sensor 23 which detects fuel property $M_F$ such as volatility, density and viscosity, fuel temperature $T_F$ and fuel pressure $P_F$. Namely, physical properties of fuel are detected by the fuel sensor 23. The fuel sensor 23 is connected to the control unit to supply its detection signal to the control unit 30.

A key switch 25, operated by a driver when the engine is started, detects initiation of start-up of the engine by a starter motor 26. The key switch 25 is connected to the control unit 30 to supply its detection signal to the control unit 30. The starter motor 26, upon turning-on of the key switch 25, gives continuous cranking movements to the engine until a first explosion is successfully taken place in the combustion chamber 5 of the engine body 1. Besides above-described sensors, other sensors such as an intake air temperature sensor and an ambient pressure sensor are provided, although they are omitted in the drawing.

Figure 2:
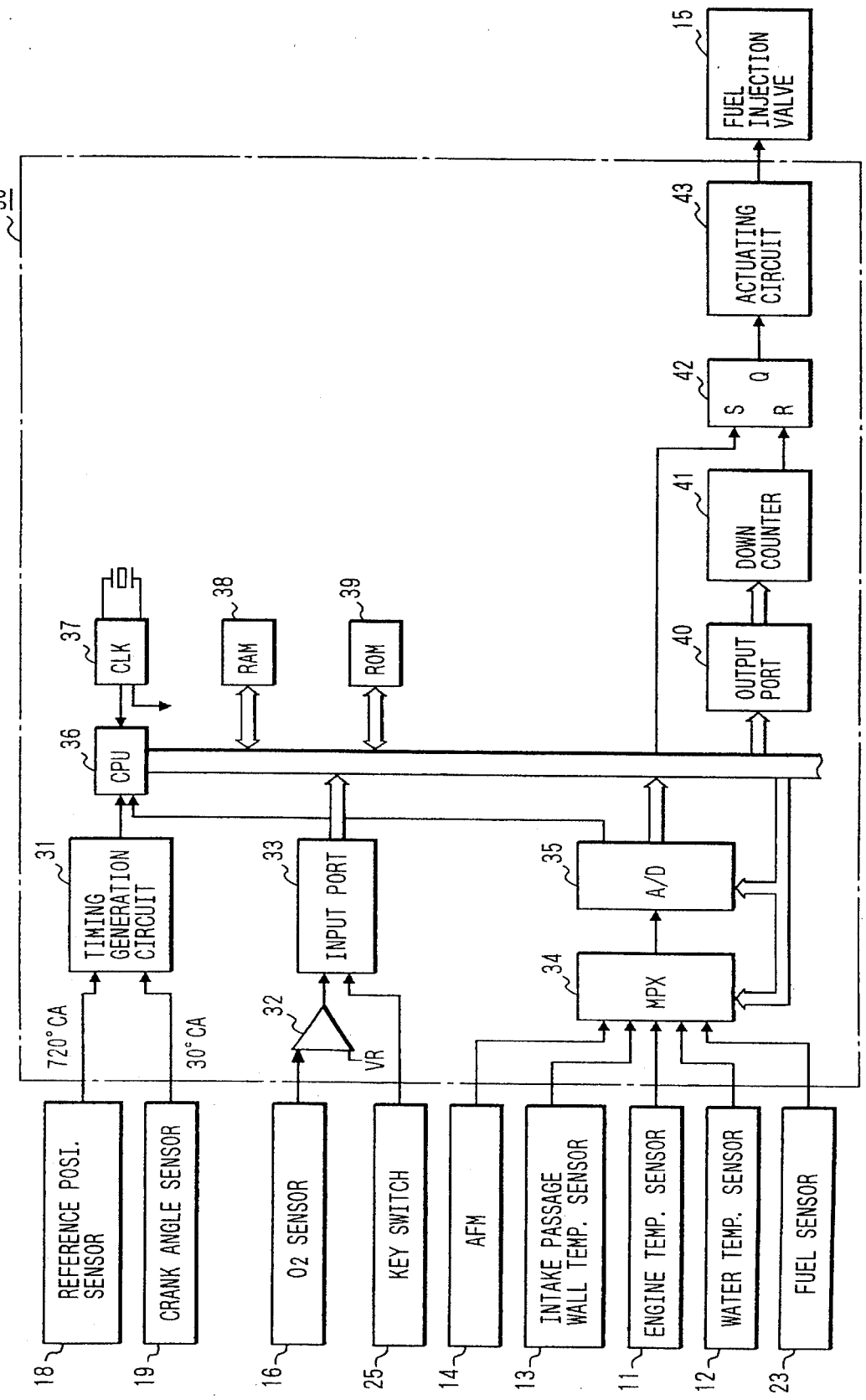
FIG. 2 is a circuit diagram showing a control unit of the preferred embodiment of the present invention.

FIG. 2 is a circuit diagram showing details of the control unit 30. In FIG. 2, a timing generation circuit 31 inputs both the reference position signal of 720° CA supplied from the reference position sensor 18 and the crank angle signal of 30° CA supplied from the crank angle sensor 19. The timing generation circuit 31 generates an interrupt signal to a CPU (i.e. central processing unit) 36 on the basis of the reference position signal and the crank angle signal.

A comparing amplifier circuit 32 compares the output of the $O_2$ sensor 16 with a reference voltage VR. More specifically, the comparing amplifier circuit 32 sends out a 1-level signal when the output signal voltage of the $O_2$ sensor 16 is equal to or larger than the reference voltage VR, while the comparing amplifier circuit 32 sends out a 0-level signal when the output signal voltage of the $O_2$ sensor 16 is smaller than the reference voltage VR. The key switch 25 outputs a 1-level signal only when the engine initiates its starting operation, and otherwise outputs a 0-level signal. The binary signals of the $O_2$ sensor 16 and the key switch 25 are supplied to the CPU 36 through an input port 33.

Output signals of the air flow meter 14, the intake passage wall temperature sensor 13, the engine temperature sensor 11, the cooling water temperature sensor 12 and the fuel sensor 23 are supplied to an A/D converter 35 through a multiplexer (MPX) 34, and then supplied from the A/D converter 35 to the CPU 36.

The CPU 36 basically calculates control values based on the various control programs. A clock generation circuit (CLK) 37 generates various clock signals and supplies then to the CPU 36 and others. A RAM (i.e. a random access memory) 38 temporarily stores various data. A ROM (i.e. a read only memory) 39 stores programs, coefficients and others. Interrupt of the CPU 36 takes place when the CPU 36 receives the interrupt signal supplied from the timing generation circuit 31 or a time interrupt signal supplied from the clock generation circuit 37.

An output port 40, a down counter 41, a flip-flop 42 and an actuating circuit 43 are provided to control the fuel injection valve 15. More specifically, a valve-opening time TAU of the fuel injection valve 15, which is calculated by the CPU 36 according to a later-described routine, is preset in the down counter 41 and also in the flip-flop 42. The down counter 41 counts the clock signal. When a carry-out terminal of the down counter 41 finally becomes a "1" level, the flip-flop 42 is reset to make the actuating circuit 43 close the fuel injection valve 15. In other words, the fuel injection valve. 15 is opened as long as the above-described valve-opening time TAU, thereby supplying fuel into the engine body 1.

An A/D conversion routine is executed every predetermined time to take in the intake air amount Q from the air flow meter 14, the intake passage wall temperature $T_W$ from the intake passage wall temperature sensor 13, the engine temperature $T_E$ from the engine temperature sensor 11, the water temperature $T_W$ from the cooling water temperature sensor 12, fuel property data such as the fuel pressure $P_F$, the fuel temperature $T_F$ and the fuel property $M_F$ from the fuel sensor 23, and others. In other words, the data stored in the RAM 38 are renewed every predetermined time. An engine speed $N_e$ is calculated based on the interrupt signal generated from the timing generation circuit 31, the interrupt signal corresponding to 30° CA of the crank angle sensor 19. Thus calculated engine speed $N_e$ is stored in a predetermined region of the RAM 38.

The engine temperature sensor 11, the cooling water sensor 12, the intake passage wall temperature 13, the air flow meter 14, the reference position sensor 18, the crank angle sensor 19 and the fuel sensor 23 cooperatively constitute the operational condition detecting means of the present invention. The CPU 36 constitutes the fuel quantity-of-state calculating means and the injection amount calculating means. The output port 40, the down counter 41, the flip-flop 42 and the actuating circuit 43 cooperatively constitute the injection valve actuating means.

Figure 6:
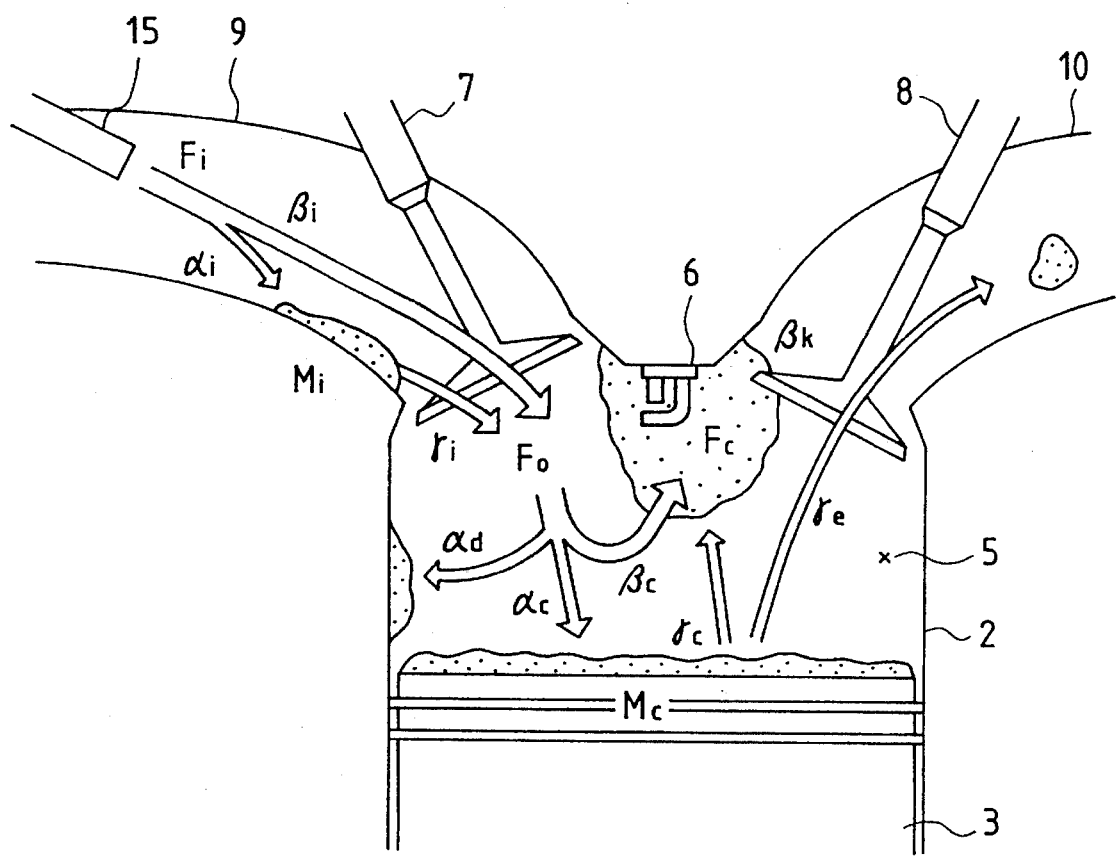
FIG. 6 is a schematic view showing an atomized fuel behavioral model, an intake passage fuel behavioral model and a combustion chamber fuel behavioral model.

FIG. 6 is a schematic view showing the atomized fuel behavioral model representing behavior of fuel injected from the fuel injection valve 15, the intake passage fuel behavioral model representing fuel behavior in the intake passage 9 and the combustion chamber fuel behavioral model representing fuel behavior in the combustion chamber 5. Liquid-state fuel injected from the fuel injection valve 15 into the intake passage 9 is divided into three, a vapor component vaporized immediately after injection, a small particle size liquid component not adhering on the wall of the intake passage 9 and a large particle size liquid component adhering on the wall of the intake passage 9. Both the vapor component and the small particle size liquid component are introduced into the combustion chamber 5 during an intake stroke first taken place after the fuel injection. On the other hand, the large particle size liquid component adhering on the wall of the intake passage 9 remains for a while on the wall without being introduced in the combustion chamber and flows on the wall of the intake passage 9 toward the combustion chamber 5 as liquid film, later entering into the combustion chamber 5 with delay of several strokes. Vapor fuel component introduced from the intake passage 9 and vapor fuel component vaporized from fuel residing as wall wet are burnt and consumed in the combustion chamber 9.

Each of the atomized fuel behavioral model, the intake passage fuel behavioral model and the combustion chamber fuel behavioral model will be explained in greater detail hereinafter.

[1] Atomized Fuel Behavioral Model and Intake Passage Fuel Behavioral Model

It is assumed in FIG. 6 that $F_i$ represents a fuel amount injected from the fuel injection valve 15 into the intake passage 9, $F_o$ represents a fuel amount entering from the intake passage 9 into the combustion chamber 5 (i.e. a combustion chamber inflow fuel amount), and $M_i$ represents a fuel amount adhering on the wall of the intake passage 9 (i.e. an intake passage adhesion fuel amount). Furthermore, $\alpha_i$ represents a ratio of a fuel amount adhering on the wall of the intake passage 9 to the whole fuel injection amount $F_i$ injected from the fuel injection valve 15 (i.e. an intake passage adhesion ratio), and $\beta_i$ represents a ratio of a fuel amount directly entering into the combustion chamber 5 to the whole fuel injection amount $F_i$ injected from the fuel injection valve 15 (i.e. a direct inflow ratio). In other words, the fuel injection amount $F_i$ is simply divided into two by the ratio of $\alpha_i:\beta_i$, where $\alpha_i+\beta_i=1$. Furthermore, $\gamma_i$ represents a ratio of a fuel amount carried over into the combustion chamber 5 to the whole intake passage adhesion fuel amount $M_i$ (i.e. an intake passage adhesion fuel carry-over ratio).

Under this intake passage fuel behavioral model, the intake passage adhesion fuel amount $M_i$ and the combustion chamber inflow fuel amount $F_o$ are obtained by solving the following equations (1) and (2).

$$M_i = M_i' + F_i \cdot \alpha_i - M_i' \cdot \gamma_i \quad \text{- - - (1)}$$

$$F_o = F_i \cdot \beta_i + M_i' \cdot 65_i \quad \text{- - - (2)}$$

where, $M_i'$ represents an intake passage adhesion fuel amount $M_i$ in the previous stroke.

[2] Combustion Chamber Fuel Behavioral Model

In the combustion chamber 5 in FIG. 6, $F_c$ represents a gaseous fuel amount in the combustion chamber 5 (i.e. a combustion chamber gaseous fuel amount), and $M_c$ represents a fuel amount adhering on the wall of the combustion chamber 5 (i.e. a combustion chamber adhesion fuel amount). Furthermore, $\alpha_d$ represents a ratio of a fuel amount adhering on the wall of the cylinder 2 to the whole combustion chamber inflow fuel amount $F_o$ (i.e. a cylinder adhesion ratio), $\alpha_c$ represents a ratio of a fuel amount adhering on other wall (e.g. an upper surface of the piston 3) of the combustion chamber 5 other than the cylinder 2 to the whole combustion chamber inflow fuel amount $F_o$ (i.e. a combustion chamber adhesion ratio), and $\beta_c$ represents a ratio of a fuel amount vaporized to the whole combustion chamber inflow fuel amount $F_o$. In other words, the combustion chamber inflow fuel amount $F_o$ is simply divided into three by the ratio of $\alpha_d:\alpha_c:\beta_c$, where $\alpha_d+\alpha_c+\beta_c=1$.

Furthermore, $\gamma_c$ represents a ratio of a fuel amount vaporized to the whole combustion chamber adhesion fuel amount $M_c$ (i.e. a fuel vaporization ratio), $\gamma_e$ represents a ratio of a fuel amount carried over to the exhaust passage in the exhaust stroke to the whole combustion chamber adhesion fuel amount $M_c$ (i.e. an exhaust carry-over ratio), and $\beta_k$ represents a ratio of a gaseous fuel amount residing in the combustion chamber 5 without being burnt in the cranking operation to the whole gaseous fuel amount in the combustion chamber 5 (i.e. a gaseous fuel residual ratio).

The present embodiment further divides the combustion chamber fuel behavioral model into two, the cranking model representing fuel behavior during a first period from start-up of engine to an initial explosion and the firing model representing fuel behavior during a second period succeeding the first period. More specifically, the cranking model defines the combustion chamber gaseous fuel amount $F_c$ and the combustion chamber adhesion fuel amount $M_c$ in accordance with the following equations (3) and (4).

$$M_c = M_c' + F_o \cdot \alpha_c - M_c' \cdot \gamma_c - M_c' \cdot \gamma_e \quad \text{- - - (3)}$$

$$F_c = F_o \cdot \beta_c + M_c' \cdot \gamma_c + F_c' \cdot \beta_k \quad \text{- - - (4)}$$

where, $M_c'$ and $F_c'$ represent a combustion chamber adhesion fuel amount $M_c$ and a combustion chamber gaseous fuel amount $F_c$ of the previous stroke, respectively.

On the other hand, the firing model defines the combustion chamber gaseous fuel amount $F_c$ and the combustion chamber adhesion fuel amount $M_c$ in accordance with the following equations (5) and (6).

$$M_c = M_c' + F_o \cdot MAX\{\alpha_c - k_2 \cdot N, 0\} - M_c' \cdot MIN\{\gamma_c + k_3 \cdot N, 1\} - M_c' \cdot \gamma_e \quad \text{- - - (5)}$$

$$F_c = F_o \cdot MIN\{\beta_c + (k_1 + k_2) \cdot N, 1\} + M_c' \cdot MIN\{\gamma_c + k_3 \cdot N, 1\} \quad \text{- - - (6)}$$

where, MAX $\{A, B\}$ represents the larger one of A and B, while MIN $\{A, B\}$ represents the smaller one of A and B.

In the equations (5) and (6), the coefficients $k_1$, $k_2$ and $k_3$ represent an increase or reduction degree of the cylinder adhesion ratio $\alpha_d$, the combustion chamber adhesion ratio $\alpha_c$ and the fuel vaporization ratio $\gamma_c$, respectively. The combustion chamber adhesion fuel amount $M_c$ and the combustion chamber gaseous fuel amount $F_c$ converge to "0" and "$F_o$", respectively, with increasing cycle counter N which increments one every one cycle after detecting the initial explosion of the engine. More specifically, the temperature of the combustion chamber of the engine body 1 quickly increases after entering into the firing condition, increasing the percentage of gaseous fuel in the combustion chamber 5. Finally, all the fuel introduced into the combustion chamber 5 is changed into gaseous fuel in the combustion chamber 5. ($F_o = F_c$)

Various model parameters used in the above equations (1) through (6) are determined based on the functions having variables of engine operational conditions and/or fuel conditions or through mapping of experimental data. Calculating method of each model parameter will be explained in detail below with reference to maps of FIGS. 7–17 which are memorized in the ROM 39.

Figure 7:
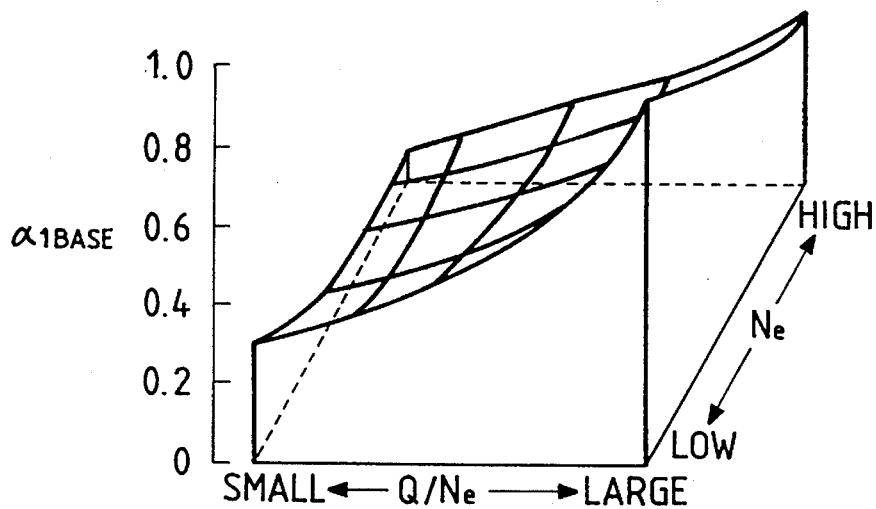
FIG. 7 is a three-dimensional map used for obtaining an intake passage adhesion ratio fundamental value $\alpha_{iBASE}$.
Figure 8:
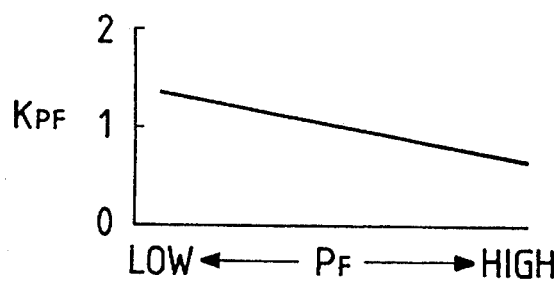
FIG. 8 is a two-dimensional map used for obtaining a correction coefficient $K_{PF}$ in accordance with a fuel pressure $P_F$.
Figure 9:
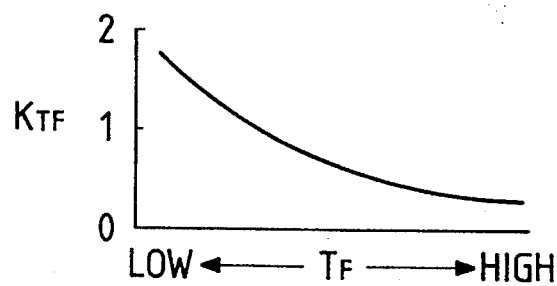
FIG. 9 is a two-dimensional map used for obtaining a correction coefficient $K_{TF}$ in accordance with a fuel temperature $T_F$.
Figure 10:
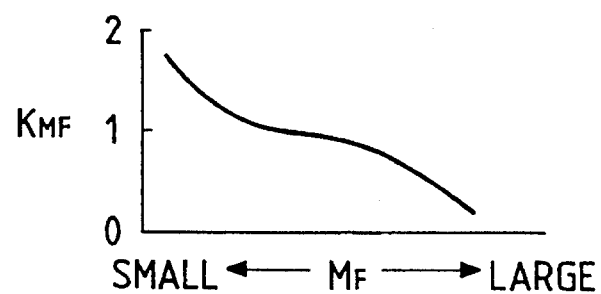
FIG. 10 is a two-dimensional map used for obtaining a correction coefficient $K_{MF}$ in accordance with fuel properties $M_F$.
Figure 11:
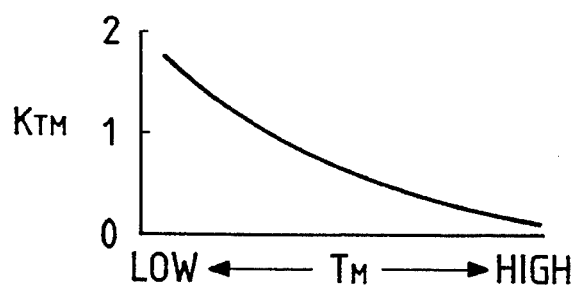
FIG. 11 is a two-dimensional map used for obtaining a correction coefficient $K_{TM}$ in accordance with an intake passage wall temperature $T_M$.
Figure 12:
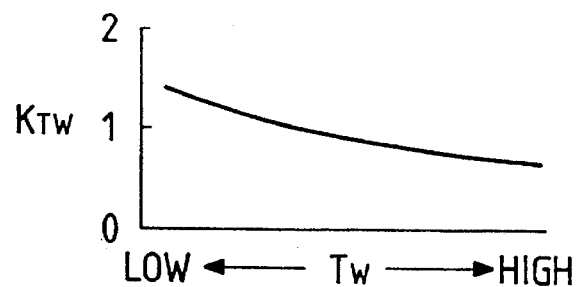
FIG. 12 is a two-dimensional map used for obtaining an correction coefficient $K_{TW}$ in accordance with a water temperature $T_W$.

To obtain the intake passage adhesion ratio $\alpha_i$, an intake passage adhesion ratio fundamental value $\alpha_{iBASE}$ is first obtained based on the present values of engine speed $N_e$ and intake air amount per unit rotation $Q/N_e$ using the three-dimensional map of FIG. 7. Next, using the two-dimensional maps of FIGS. 8 through 12, a correction coefficient $K_{PF}$ corresponding to the present value of fuel pressure $P_F$, a correction coefficient $K_{TF}$ corresponding to the present value of fuel temperature $T_F$, a correction coefficient $K_{MF}$ corresponding to the present value of fuel property $M_F$, a correction coefficient $K_{TM}$ corresponding to the present value of intake passage wall temperature $T_M$, and a correction coefficient $K_{TW}$ corresponding to the present value of water temperature $T_W$. Each of the above correction coefficients has a characteristics that its value increases with decreasing detecting value of its variable. These correction coefficients are then multiplied with the intake passage adhesion ratio fundamental value $\alpha_{iBASE}$ to obtain the intake passage adhesion ratio $\alpha_i$ according to an equation $\alpha_i = \alpha_{iBASE} \cdot K_{PF} \cdot K_{TF} \cdot K_{MF} \cdot K_{TM} \cdot K_{TW}$. Next, a direct inflow ratio $\beta_i$ is simply obtained according to an equation $\beta_i = 1 - \alpha_i$. It will be understood from the above equations that the value of intake passage adhesion ratio $\alpha_i$ becomes larger when the engine is running at low speeds or in a low-temperature condition, causing a large amount of film flow on the wall of the intake passage 9. On the other hand, the value of intake passage adhesion ratio $\alpha_i$ decreases to "0" when the engine is running at high speeds or in a high-temperature condition, allowing all the fuel injected from the fuel injection valve 15 to directly enter into the combustion chamber 5.

Figure 13:
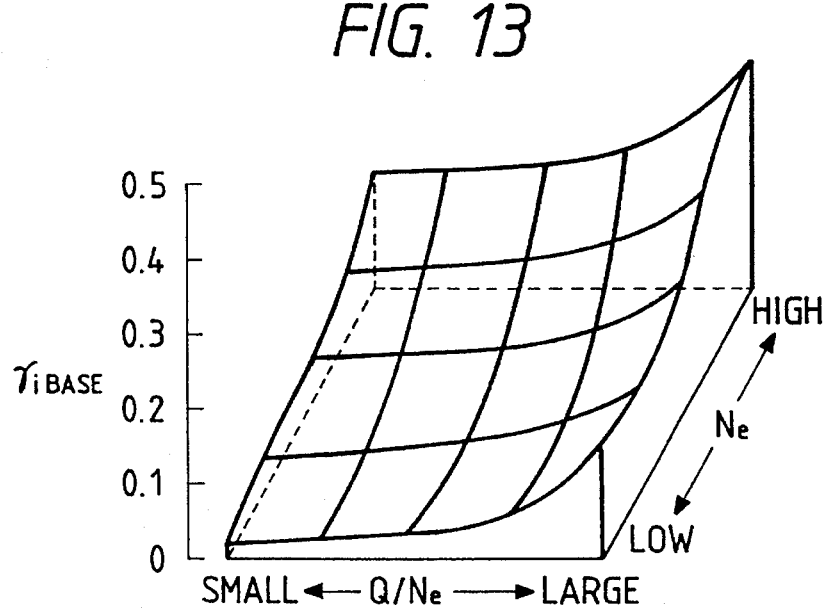
FIG. 13 is a three-dimensional map used for obtaining a fuel carry-over ratio fundamental value $\gamma_{iBASE}$.

To obtain the intake passage adhesion fuel carry-over ratio $\gamma_i$, a fuel carry-over ratio fundamental value $\gamma_{iBASE}$ is first obtained based on the present values of engine speed $N_e$ and intake air amount per unit engine revolution $Q/N_e$ using the three-dimensional map of FIG. 13. Next, the fuel carryover ratio fundamental value $\gamma_{iBASE}$ is multiplied with $(1-K_{TM})$ and $(1-K_{TW})$ to obtain the intake passage adhesion fuel carry-over ratio $\gamma_i$ according to an equation $\gamma_i = \gamma_{iBASE} \cdot (1-K_{TM}) \cdot (1-K_{TW})$. Correction coefficients $K_{TM}$ and $K_{TW}$ are obtained from the two-dimensional maps of FIGS. 11 and 12 as described above. It will be understood that the value of intake passage adhesion fuel carry-over ratio $\gamma_i$ becomes smaller when the engine is running at low speeds or in a low-temperature condition, causing wall wet residing long time on the wall of the intake passage 9. On the other hand, the value of intake passage adhesion fuel carry-over ratio $\gamma_i$ becomes large when the engine is running at high speeds or in a high-temperature condition, increasing the carry-over fuel amount.

Figure 14:
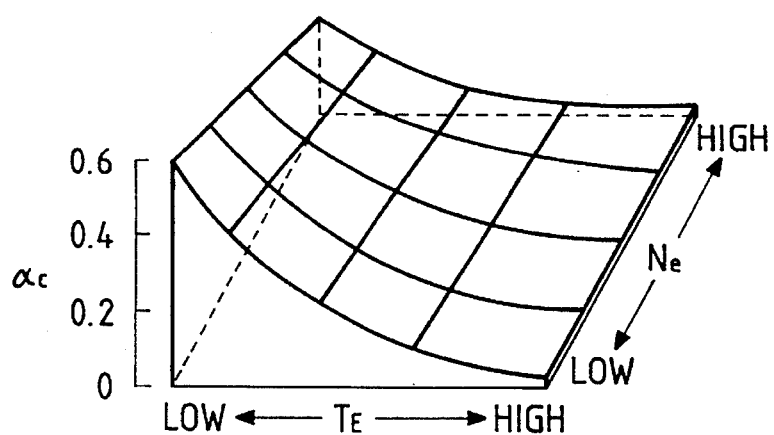
FIG. 14 is a three-dimensional map used for obtaining a combustion chamber adhesion ratio $\alpha_C$.
Figure 15:
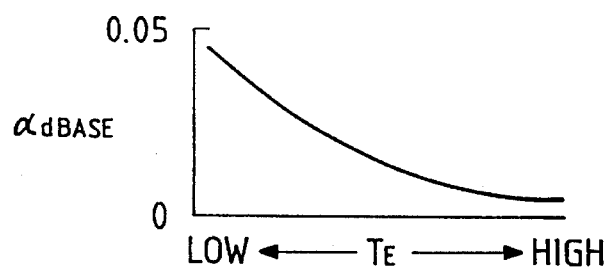
FIG. 15 is a two-dimensional map used for obtaining a cylinder adhesion ratio fundamental value $\alpha_{dBASE}$.

The combustion chamber adhesion ratio $\alpha_c$ is obtained based on the present values of engine speed $N_e$ and engine temperature $T_E$ using the three-dimensional map of FIG. 14. To obtain the cylinder adhesion ratio $\alpha_d$, a cylinder adhesion ratio fundamental value $\alpha_{dBASE}$ is first obtained based on the present value of engine temperature $T_E$ using the two-dimensional map of FIG. 15. Next, the cylinder adhesion ratio fundamental value $\alpha_{dBASE}$ is multiplied with correction coefficient $K_{TW}$ obtained from the map of FIG. 12 to obtain the cylinder adhesion ratio $\alpha_d$ according to an equation $\alpha_d = \alpha_{dBASE} \cdot K_{TW}$. The gaseous fuel ratio $\beta_c$ is easily obtained according to an equation $\beta_c = 1 - \alpha_d - \alpha_c$. Thus, it will be understood that the values of cylinder adhesion ratio $\alpha_d$ and combustion chamber adhesion ratio $\alpha_c$ are relatively large with respect to the value of the gaseous fuel ratio $\beta_c$ when the engine is running at low speeds or in a low-temperature condition, causing wall wet residing on the wall of the cylinder 2 and the combustion chamber 5. On the other hand, the value of cylinder adhesion ratio $\alpha_d$ and combustion chamber adhesion ratio $\alpha_c$ are decreased to "0" when the engine is running at high speeds or in a high-temperature condition; therefore, all the fuel entering into the combustion chamber 5 is vaporized completely.

Figure 16:
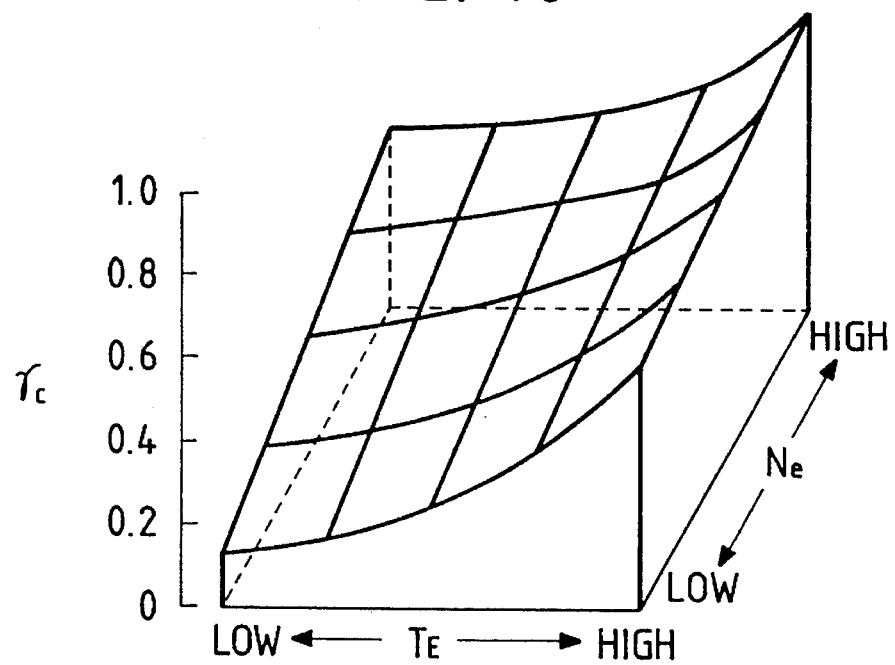
FIG. 16 is a three-dimensional map used for obtaining a fuel vaporization ratio $\gamma_C$.
Figure 17:
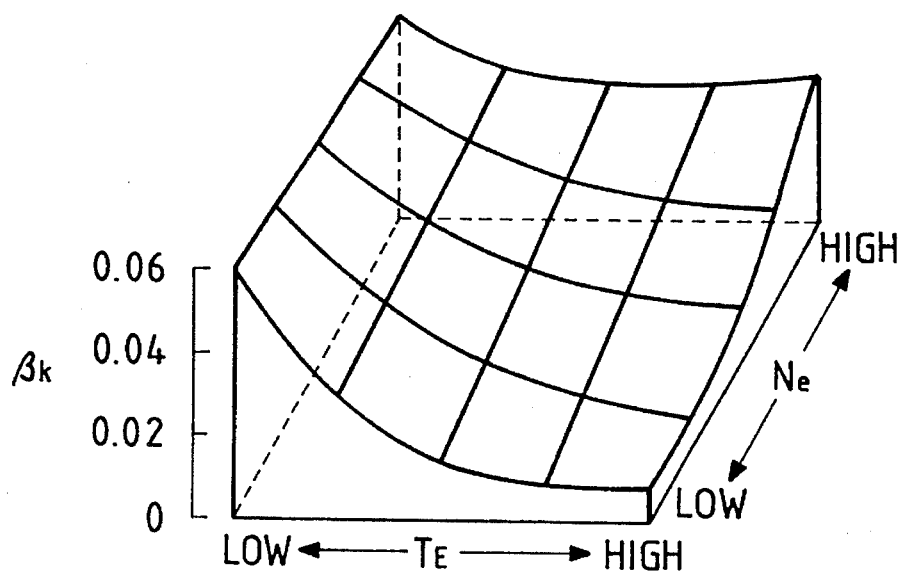
FIG. 17 is a three-dimensional map used for obtaining a gaseous fuel residual ratio $\beta_k$.

The fuel vaporization ratio $\gamma_c$ is obtained based on the present values of engine speed $N_e$ and engine temperature $T_E$ using the three-dimensional map of FIG. 16. The exhaust carry-over ratio $\gamma_e$ is obtained by multiplying the fuel vaporization ratio $\gamma_c$ with (⅕). (i.e. $\gamma_e = \gamma_c \cdot (1/5)$) The gaseous fuel residual ratio $\beta_k$ is obtained based on the present values of engine speed $N_e$ and engine temperature $T_E$ using the three-dimensional map of FIG. 17. The fuel vaporization ratio $\gamma_c$ increases with increasing engine speed or engine temperature, while the gaseous fuel residual ratio $\beta_k$ increases with increasing engine speed and decreases with increasing engine temperature.

Figure 4:
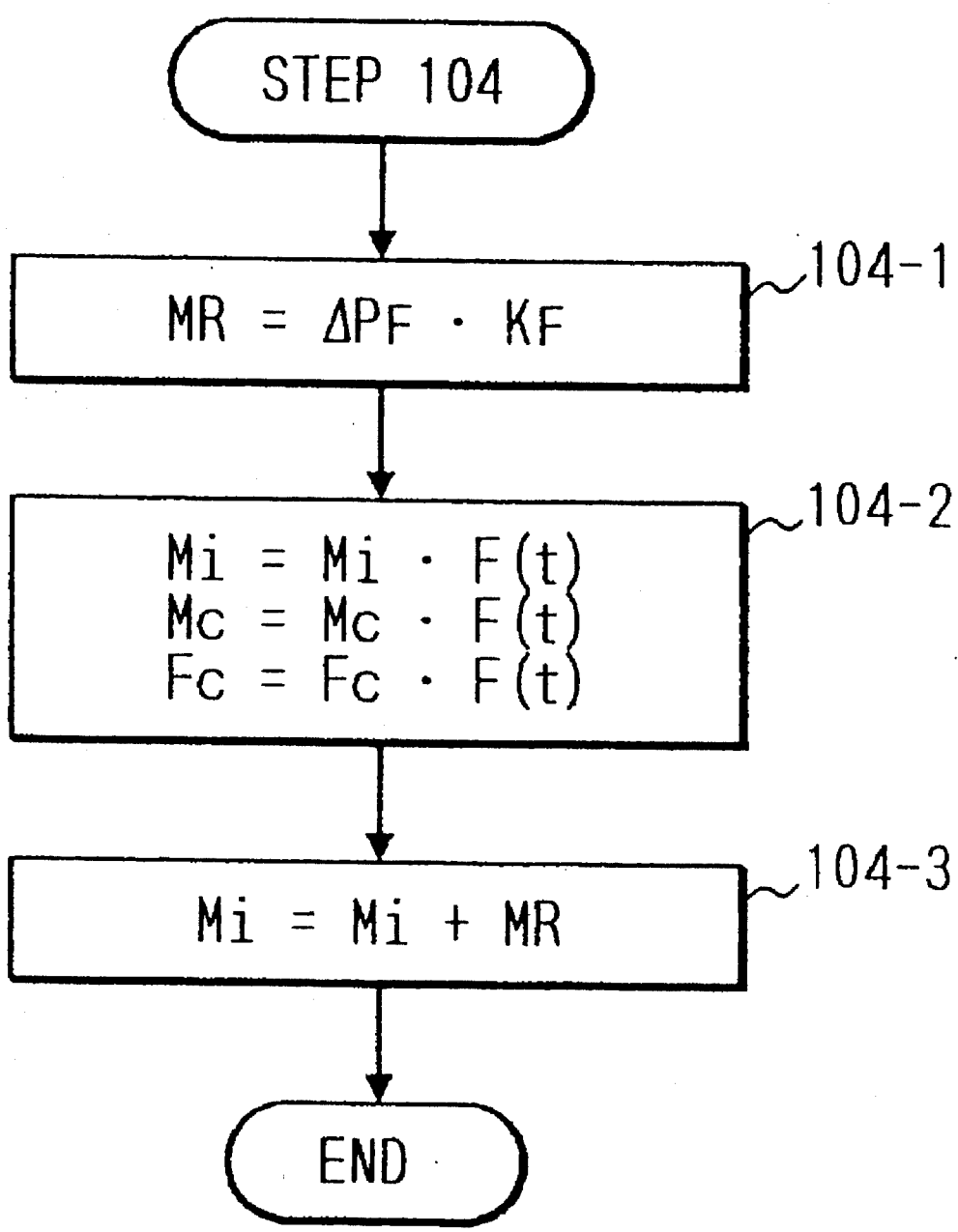
FIG. 4 is a flowchart showing a subroutine of the flowchart of FIG. 3.
Figure 5:
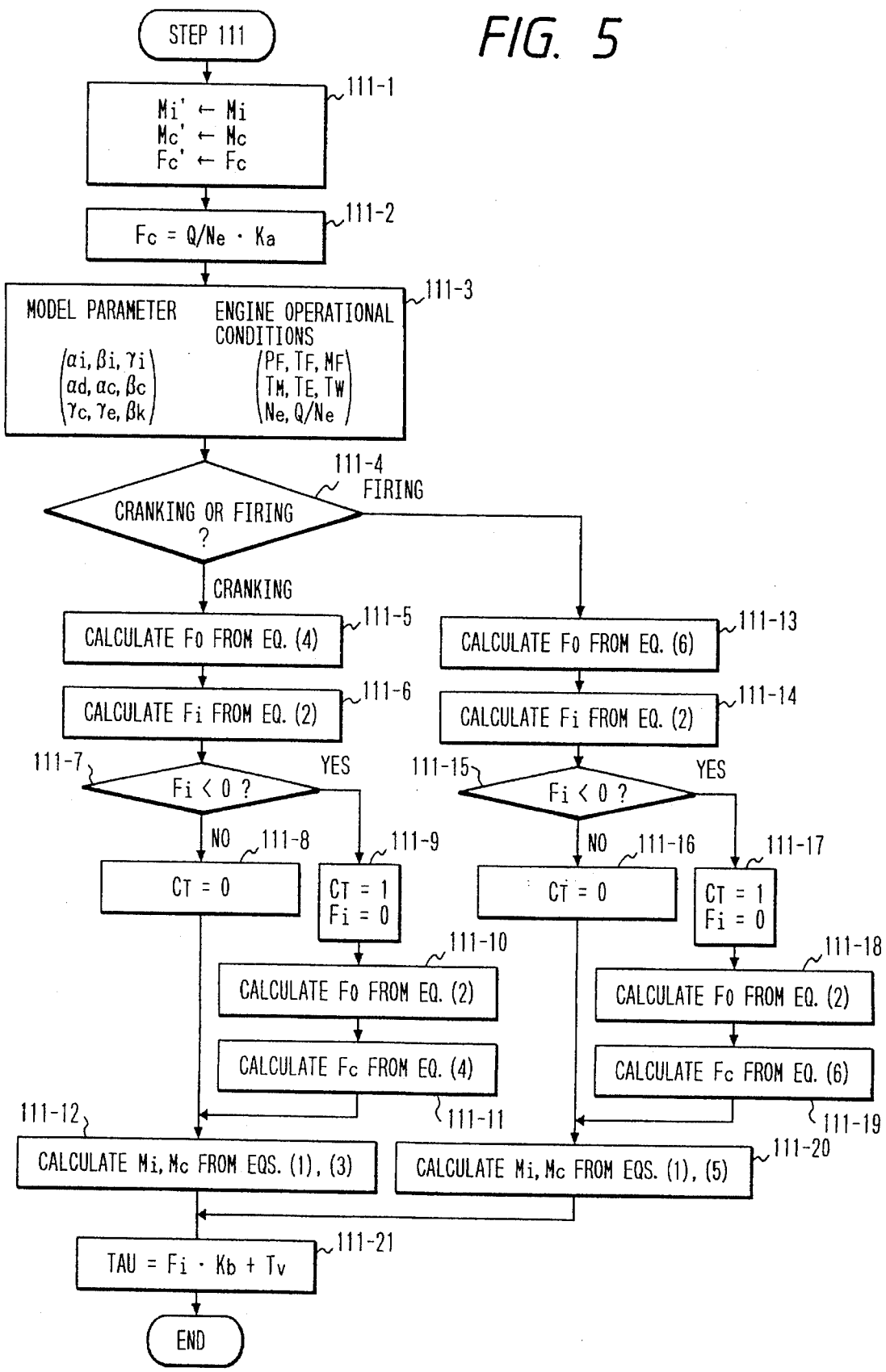
FIG. 5 is a flowchart showing another subroutine of the flowchart of FIG. 3.

Next, an operation of the fuel injection control apparatus of the present embodiment will be explained with reference to the flowcharts of FIGS. 3 through 5, taking the fuel behavioral models into consideration.

Figure 3:
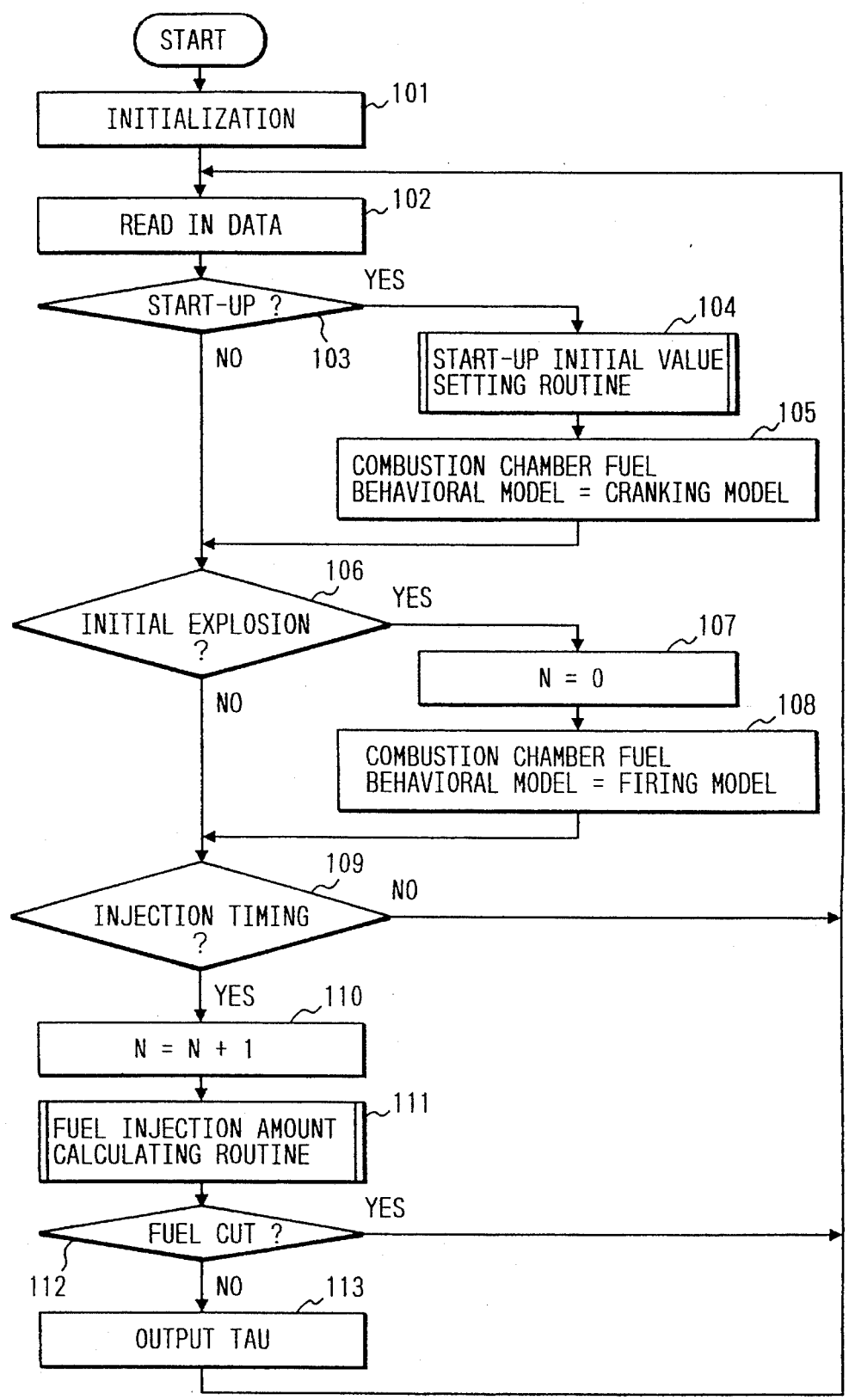
FIG. 3 is a flowchart showing a fuel injection control routine executed by a CPU of the control unit of the preferred embodiment of the present invention.

The flowchart of FIG. 3 shows a fuel injection control routine stored as a program in a predetermined area of the ROM 39. This routine is executed by the CPU 36 at periods of 3–10 msec. Flowcharts of FIGS. 4 and 5 are subroutines showing details of steps 104 and 111 of FIG. 3.

The routine of FIG. 3 starts upon power supply to the control circuit 30. The CPU 36 first of all executes an initialization processing on as a step 101. In this initialization processing, all the initialization necessary for executing the program are done. Subsequently, the CPU 36 proceeds to a step 102 to read data from the sensors and store these data into the RAM 38 in the control circuit 30. Then, the CPU 36 proceeds to a step 103 to make a judgement as to whether the engine starts or not based on the start detecting signal fed from the key switch 25. If the judgement result is NO in the step 103 (i.e. the engine is not yet started), the CPU 36 directly proceeds to a step 106. If the judgement result is YES in the step 103 (i.e. the engine is started), the CPU 36 proceeds to steps 104 and 105 before going to the step 106. In the step 104, the CPU 36 sets a start-up initial value with respect to each of the intake passage adhesion fuel amount $M_i$, the combustion chamber adhesion fuel amount $M_c$ and the combustion chamber gaseous fuel amount $F_c$. Details of the step 104 will be explained later with reference to the flowchart of FIG. 4. In the step 105, the CPU 36 selects the cranking model as the combustion chamber fuel behavioral model.

Thereafter, in the step 106, the CPU 36 makes a judgement as to whether or not an initial explosion succeeds. More specifically, the initial explosion is indirectly recognized as succeeding when the engine speed $N_e$ exceeds a predetermined value. By the way, this initial explosion judgement is carried out by using the data such as combustion pressure, combustion light, exhaust temperature, and output torque other than the engine speed $N_e$. If the judgement result is NO in the step 106 (i.e. the initial explosion is not yet taken place), the CPU 36 directly proceeds to a step 109. If the judgement result is YES in the step 106 (i.e. the initial explosion is already taken place), the CPU 36 proceeds to steps 107 and 108 before going to the 109. Namely, when the initial explosion is detected, the CPU 36 clears the cycle counter N to "0" in the step 107 and subsequently switches the combustion chamber fuel behavioral model from the cranking model to the firing model in the step 108.

After that, the CPU 36 makes a judgement in the step 109 as to whether the fuel injection timing has come or not on the basis of the detections signals of the reference position sensor 18 and the crank angle sensor 19. If the judgement result is NO in the step 109, the CPU 36 returns to the step 102. If the judgement is YES in the step 109 (i.e. injection timing has come), the CPU 36 proceeds to a step 110 to increment the cycle counter N by a value "1". This cycle counter N is used as one parameter for the combustion chamber fuel behavioral model (i.e. the firing model in this instance). Subsequently, the CPU 36 proceeds to a step 111 wherein the CPU 36 calculates a fuel injection amount required for adjusting the actual gaseous air-fuel ratio to a desired value in the combustion chamber 5, using the atomized fuel behavioral model, the intake passage fuel behavioral model and the combustion chamber fuel behavioral model. Details of the step 111 will be explained in detail with reference to the flowchart of FIG. 5.

Thereafter, the CPU 36 proceeds to a step 112 to make a judgement as to whether or not the fuel cut operation is necessary. The judgement of fuel cut operation is carried out using the value of a fuel cut flag CT disclosed in the flowchart of FIG. 5. More specifically, the judgement result of the step 112 becomes "YES" when the fuel cut flag CT is "1" and the CPU 36 returns to the step 102 without executing fuel injecting operation. On the other hand, the judgement result of the step 112 becomes "NO" when the fuel cut flag CT is "0" and the CPU 36 proceeds to a step 113 to preset a valve-opening time TAU in the down counter 41, the valve-opening time TAU corresponding to the required fuel injection amount. Thus, the fuel injection valve 15 is controlled to open with this valve-opening time TAU.

Next, details of the step 104 (i.e. the start-up initial value setting routine) will be explained with reference to the flowchart of FIG. 4.

In a step 104-1, the CPU 36 calculates a fuel leakage amount MR leaking from the fuel injection valve 15 into the intake passage 9 during a dormant period of the engine. More specifically, a fuel pressure drop $\Delta P_F$ during the dormant period of the engine is obtained by monitoring the value of fuel pressure $P_F$ of the fuel sensor 23. The fuel leakage amount MR is calculated by multiplying the fuel pressure drop $\Delta P_F$ with the coefficient $K_F$. (i.e. $MR=\Delta P_F \cdot K_F$) Namely, the present embodiment calculates the fuel leakage amount MR by utilizing the fact that the pressure in the fuel pipe 22 reduces when fuel leakage occurs from the fuel injection valve 15 during the dormant period of the engine.

Subsequently, in a step 104-2, the CPU 36 obtains initial values of the intake passage adhesion fuel amount $M_i$, the combustion chamber adhesion fuel amount $M_c$ and the combustion chamber gaseous fuel amount $F_c$ by multiplying the fuel reduction function F(t) representing fuel reduction during the dormant period of the engine with each of the previously obtained values of the intake passage adhesion fuel amount $M_i$, the combustion chamber adhesion fuel amount $M_c$ and the combustion chamber gaseous fuel amount $F_c$ which are obtained immediately before the engine was stopped. The fuel reduction function F(t) takes 37 1" at the time the engine just stops (i.e. at an engine dormant time t=0), and converges to "0" with increasing dormant period of the engine (i.e. at the engine dormant time $t \rightarrow \infty$).

Thereafter, in a step 104-3, the CPU 36 adds the fuel leakage amount MR with the intake passage adhesion fuel amount $M_i$ to obtain a corrected intake passage adhesion fuel amount $M_i$, then ending this routine. In short, the routine of FIG. 4 achieves a modeling of fuel behavior during the dormant period of engine, thereby realizing an accurate fuel injection control in the engine start-up condition. It will be also preferable to provide a fuel detecting sensor in the intake passage 9 to directly detect the intake passage fuel amount to set the intake passage adhesion fuel amount $M_i$ in the engine start-up condition.

Next, the step 111 in which the fuel injection amount of the fuel injection valve 15 is calculated using the atomized fuel behavioral model, the intake passage fuel behavioral model and the combustion chamber fuel behavioral model will be explained with reference to the flowchart of FIG. 5.

In a step 111-1, the CPU 36 renews the values of previous intake passage adhesion fuel amount $M_i'$, previous combustion chamber adhesion fuel amount $M_c'$ and previous combustion chamber gaseous fuel amount $F_c'$ by replacing them with the values of the intake passage adhesion fuel amount $M_i$, the combustion chamber adhesion fuel amount $M_c$ and the combustion chamber gaseous fuel amount $F_c$ which are obtained in the previous processing cycle.

Then, in a step 111-2, the CPU 36 calculates the combustion chamber gaseous fuel amount $F_c$ by multiplying the intake amount per unit engine revolution $Q/N_e$ with a coefficient $K_a$ (i.e. $F_c=Q/N_e \cdot K_a$) In other words, the step 112-2 calculates a gaseous fuel amount required for realizing an optimum chamber gaseous air-fuel ratio (i.e. a combustion chamber gaseous fuel amount $F_c$) in accordance with operational conditions of the engine.

In a step 111-3, the CPU 36 determines various model parameters ($\alpha_i$, $\beta_i$, $\gamma_i$, $\alpha_d$, $\alpha_c$, $\beta_c$, $\gamma_c$, $\gamma_e$, $\beta_k$) based on the detected engine operational data ($P_F$, $T_F$, $M_F$, $T_M$, $T_E$, $T_W$, $N_e$, $Q/N_e$). Determination of these model parameters is based on the functions or mapping calculation of experimental data. Subsequently, the CPU 36 makes a judgement in a step 111-4 as to whether the combustion chamber fuel behavioral model is the cranking model or the firing model. This model setting is based on the result of previously described steps 103–108. If the cranking model is used (i.e. the initial explosion is not taken place), the CPU 36 proceeds to steps 111-5 to 111-12 and 111-21 to execute the procedures of these steps. More specifically, in the step 111-5, the CPU 36 calculates the combustion chamber inflow fuel amount $F_o$ by modifying the above-described equation (4). Thus obtained combustion chamber inflow fuel amount $F_o$ removes affection of vaporized component of adhesion fuel in the combustion chamber 5 and residual fuel unburnt in the previous combustion stroke which are subtracted from the combustion chamber gaseous fuel amount $F_c$ calculated in the step 111-2, and takes account of fuel entering into the combustion chamber 5 and vaporized therein. Next, in the step 111-6, the CPU 36 calculates the fuel injection amount $F_i$ of the fuel injection valve 15 by modifying the above-described equation (2). Thus obtained fuel injection amount $F_i$ removes affection of vaporized component of adhesion fuel in the intake passage 9 which is subtracted from the combustion chamber inflow fuel amount $F_o$ calculated in the step 111-5, and takes account of fuel injected from the injection valve 15 and entering into the combustion chamber 5.

Furthermore, the CPU 36 makes a judgement in a step 111-7 as to whether or not the fuel injection amount $F_i$ calculated in the step 111-6 is lower than "0". If the fuel injection amount $F_i$ is equal to or larger than "0", the CPU 36 proceeds to a step 111-8 to reset the fuel cut flag CT to "0". This fuel cut flag CT is used in the judgement of the fuel cut operation in the step 112 of FIG. 3 as described above. If the fuel injection amount $F_i$ is smaller than "0", the CPU 36 proceeds to a step 111-9 to set the fuel cut flag CT to "1" and equalize the fuel injection amount $F_i$ to "0". Namely, the fuel injection valve 15 cannot execute a negative injection; therefore, the fuel injection is skipped and the fuel injection amount $F_i$ is corrected to "0". In response to the correction of the fuel injection amount $F_i$ to "0", the CPU 36 again calculates the combustion chamber inflow fuel amount $F_o$ using the equation (2) in a step 111-10 and the combustion chamber gaseous fuel amount $F_c$ using the equation (4) in a step 111-11.

Thereafter, in a step 111-12, the CPU 36 calculates the present values of the intake passage adhesion fuel amount $M_i$ and the combustion chamber adhesion fuel amount $M_c$ using the previously described equations (1) and (2). The, in a step 111-21, the CPU 36 calculates the valve-opening time TAU of the fuel injection valve 15 by multiplying the fuel injection amount $F_i$ ($F_i$=0 in the case of $F_i$<0) obtained in the step 111-6 with a coefficient $K_b$, and adding a resultant value with an invalid injection time $T_V$ of the fuel injection valve 15. (i.e. TAU =$F_i \cdot K_b + T_V$) Then, the CPU 36 ends this routine.

Meanwhile, if the firing model is found in the step 111-4, the CPU 36 executes steps 111-13 through 111-20 instead of the above-described steps 111-5 through 111-12. The firing model is different from the cranking model in that the step 111-13 and 111-19 uses the equation (6) instead of the equation (4) to calculate the combustion chamber inflow fuel amount $F_o$ and the combustion chamber gaseous fuel amount $F_c$, and the step 111-20 uses the equation (5) instead of the equation (3) to obtain the intake passage adhesion fuel amount $M_i$ and the combustion chamber adhesion fuel amount $M_c$.

As explained in the foregoing description, the fuel injection control apparatus of the present embodiment uses the atomized fuel behavioral model, the intake passage fuel behavioral model and the combustion chamber fuel behavioral model shown in FIG. 6 to calculate the fuel quantity-of-state in the engine based on various engine operational data including fuel properties. (Refer to the step 111-3 of FIG. 5) Furthermore, the combustion chamber fuel behavioral model is set to the cranking model representing fuel behavior during the first period from start-up of engine to an initial explosion and then set to the firing model representing fuel behavior during the second period succeeding the first period. Thus, the cranking model is used before detecting the initial explosion to calculate the fuel injection amount $F_i$ for adjusting the actual gaseous air-fuel ratio in the combustion chamber 5 to the desired value in accordance with the fuel quantity-of-state (refer to the steps 111-5 and 111-6 of FIG. 5). Then, the cranking model is switched to the firing model after detecting the initial explosion to calculate the fuel injection amount $F_i$ (refer to the steps 111-13 and 111-14 of FIG. 5). Moreover, when the fuel injection valve 15 causes fuel leakage during the dormant period of the engine, such a fuel leakage amount is reflected to the determination of the initial value of the cranking model (refer to the steps 104-1 through 104-3).

In summary, the present embodiment brings the following effects. The actual gaseous air-fuel ratio in the combustion chamber 5 is accurately controlled to the desired value even if a large amount of liquid fuel resides as wall wet in the intake passage 9 and the combustion chamber 5 in a low-temperature condition before and immediately after the start-up of the engine. Consequently, the engine smoothly starts up and harmful emission is reduced. The fuel behavior is modeled in such a manner that the wall wet amount is gradually reduced after the engine is started; thus, the gaseous air-fuel ratio is controlled in response to the reduction of the wall wet. Thus, the engine operational condition is always optimized and an excellent drivability is realized.

Figure 18:
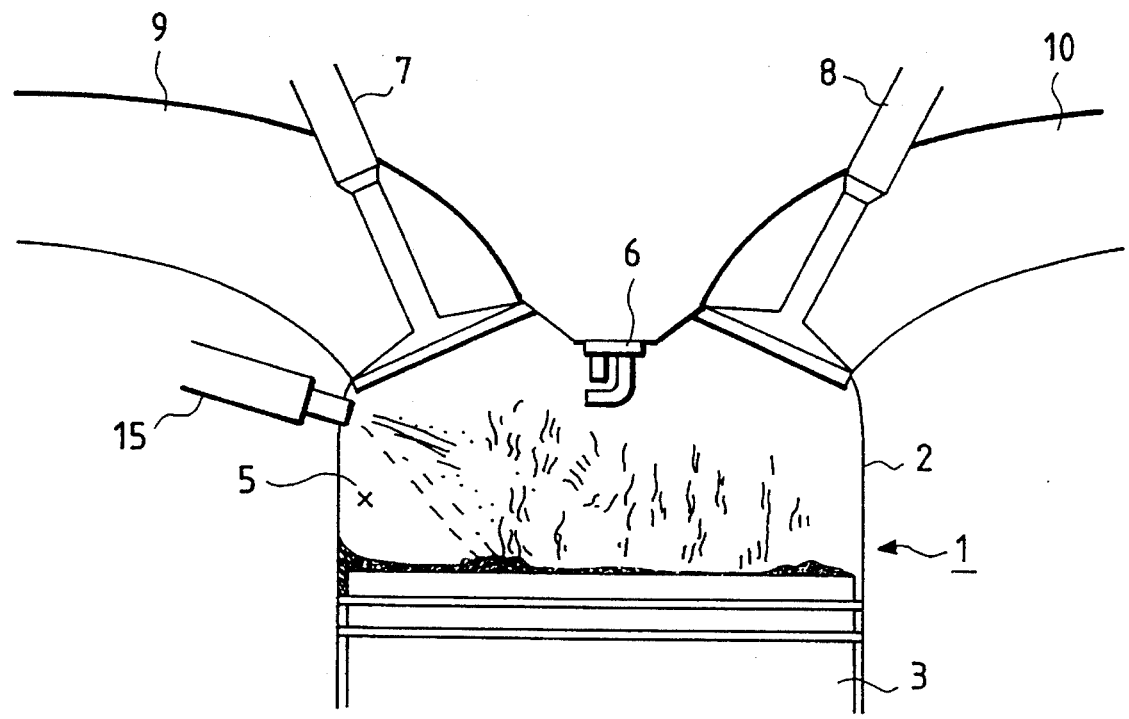
FIG. 18 is a schematic view showing a direct injection type combustion engine embodying the present invention.
Figure 19A:
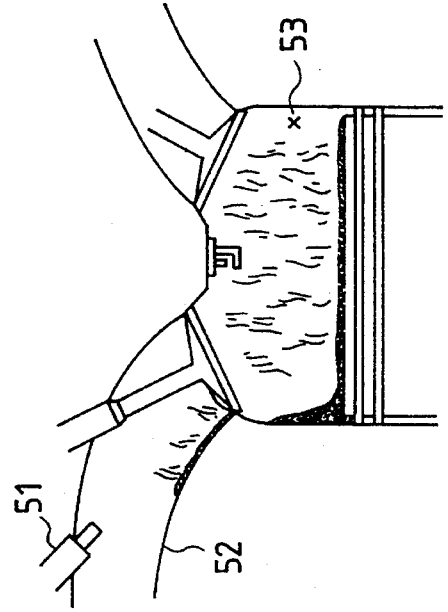
Figure 19B:
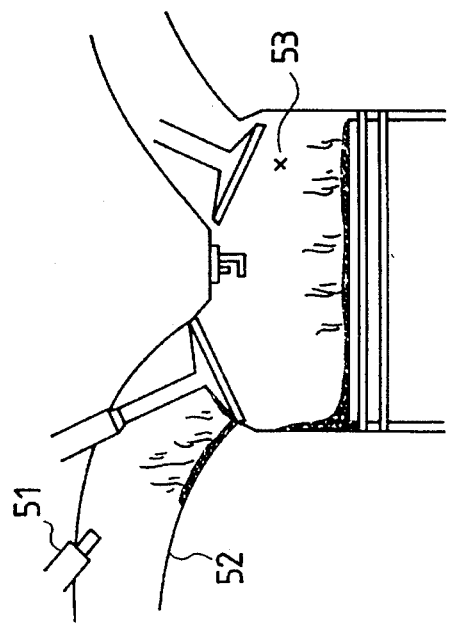
Figure 19C:
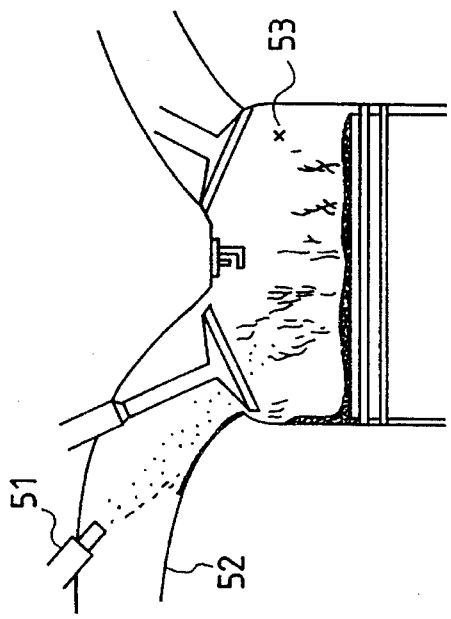
Figure 19D:
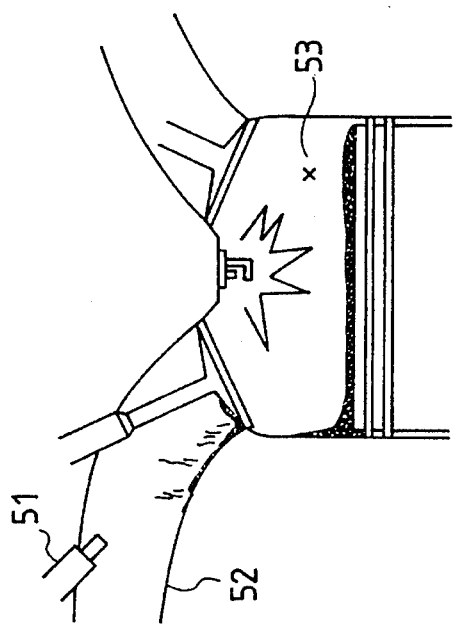
Figure 20:
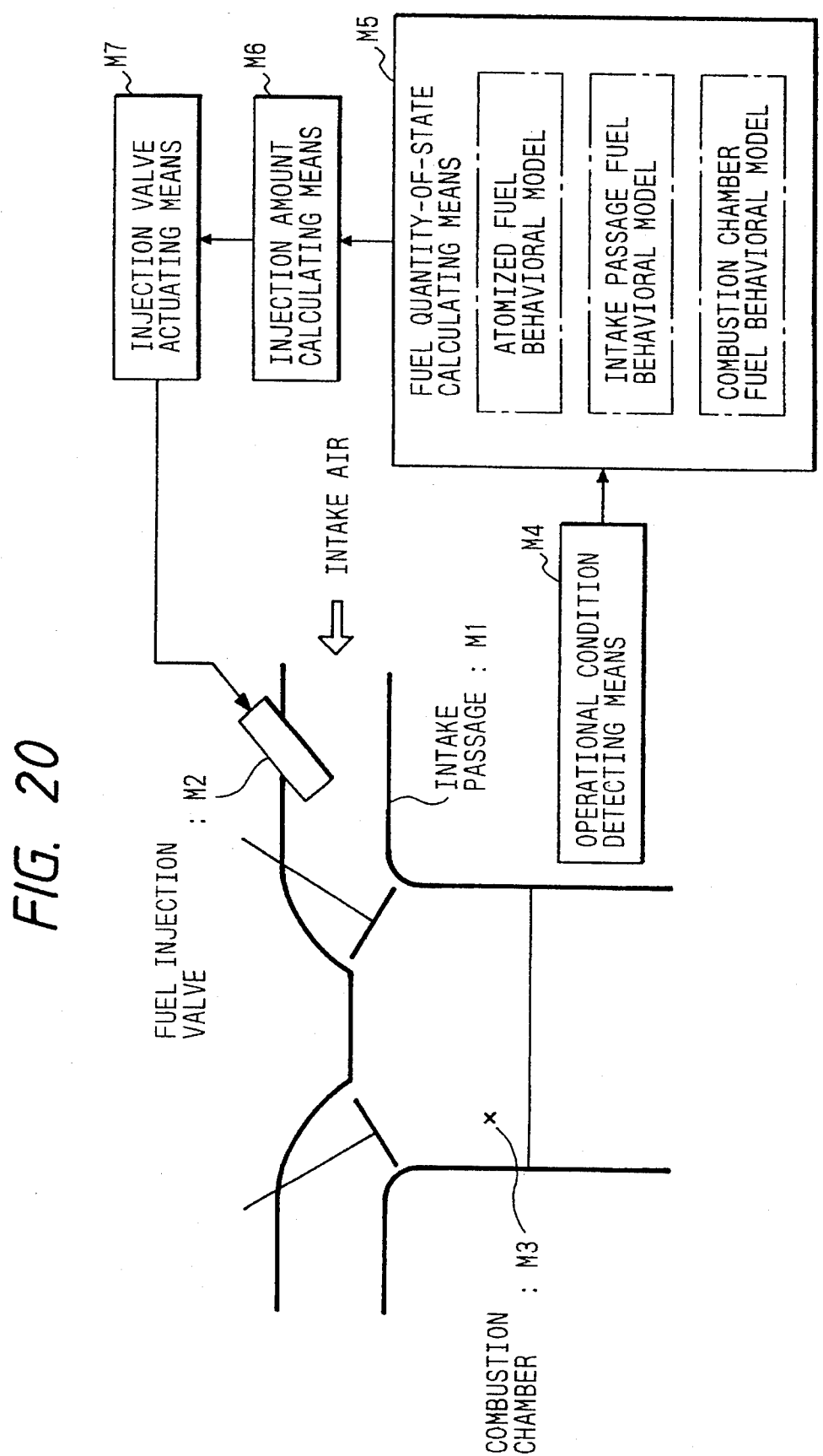
FIG. 20 is a block diagram schematically showing an arrangement of a first aspect of the present invention.
Figure 21:
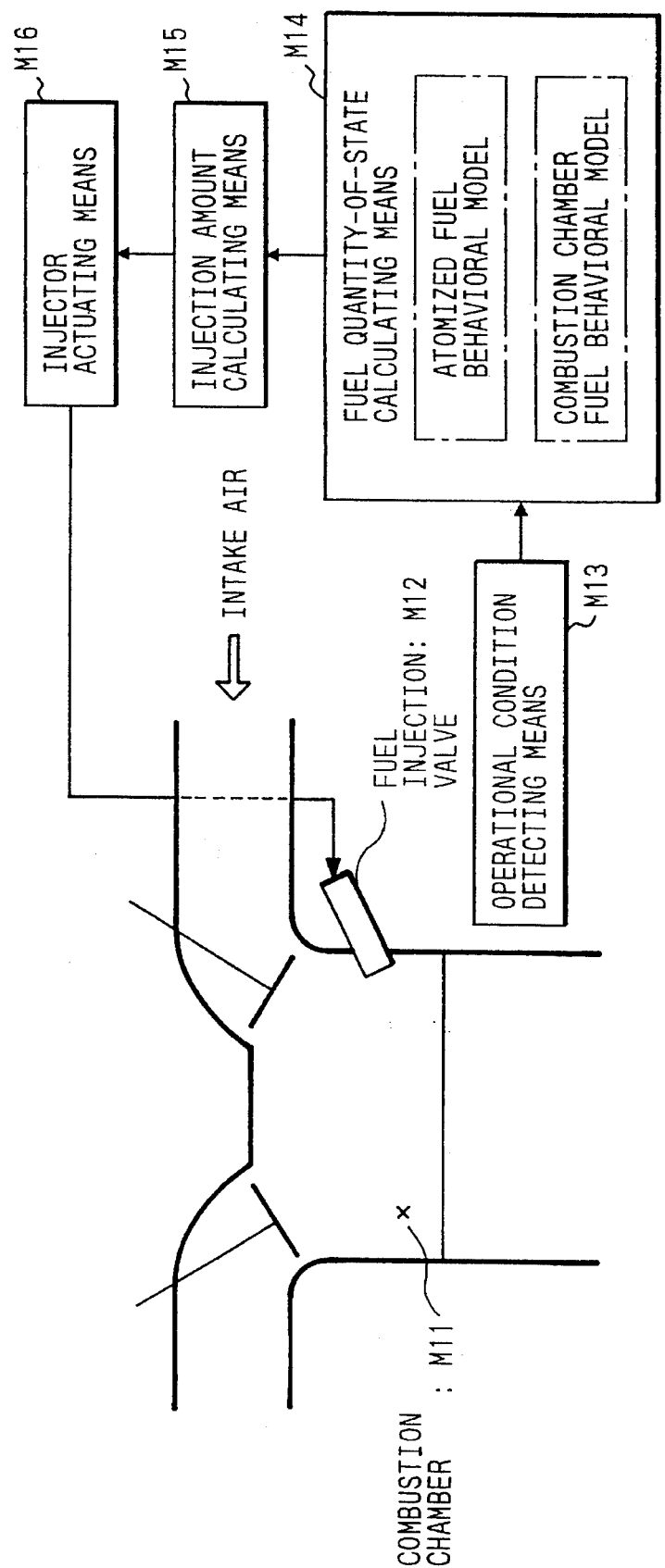
FIG. 21 is a block diagram schematically showing an arrangement of a second aspect of the present invention.

Besides the indirect injection type internal combustion engine shown in FIG. 6, the present invention can be employed in a direct injection type internal combustion engine shown in FIG. 18. The direct injection type internal combustion engine has the fuel injection valve 15 directly communicating with the combustion chamber 5; therefore, all the injected fuel is surely entered into the combustion chamber 5. Thus, it is no longer necessary to consider the fuel amount adhering on the intake passage 9. Thus, the intake passage adhesion ratio is set to "0" (i.e. $\alpha_f$=0), the direct inflow ratio is set to "1" ($\beta_f$=1), and the intake passage adhesion fuel carry-over ratio is set to "0" (i.e. $\gamma_f$=0). Using the values of $\alpha_f$=0, $\beta_f$=1 and $\gamma_f$=0, the equations (1) and (2) are modified into $M_i$=0 and $F_o$=$F_i$ which are used to represent the fuel behavior in the combustion chamber of FIG. 18 using the equations (3) through (6). In other words, the intake passage fuel behavioral model is omitted. Fuel behavior in this case is modeled by using only the atomized fuel behavioral model and the combustion chamber fuel behavioral model. The control apparatus for this direct type internal combustion is basically the same as the device disclosed in FIGS. 1 and 2 and its operation is based on the same flowcharts of FIG. 3–5 above-described, although difference of fuel injection valve position or omission of the intake passage fuel behavioral model necessitates some modifications which are not shown but will be easily understood.

Furthermore, it will be possible in the fuel behavioral model of FIG. 6 to set another fuel behavioral model representing behavior of fuel escaping from the cylinder wall to an oil pan through a gap between the cylinder 2 and the piston 3, or to set still another fuel behavioral model representing behavior of fuel adhering on the upper surface of the intake valve 7.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A fuel injection control apparatus for an internal combustion engine comprising:

a fuel injection valve disposed in an intake passage;

a combustion chamber communicated with the intake passage for introducing fuel injected from the fuel injection valve at predetermined intake timings;

operational condition detecting means for detecting various operational conditions including properties of fuel;

fuel quantity-of-state calculating means for calculating a fuel quantity-of-state in the combustion chamber in accordance with the operational conditions detected by the operational condition detecting means, using an atomized fuel behavioral model representing behavior of fuel injected from the fuel injection valve, an intake passage fuel behavioral model representing fuel behavior in the intake passage and a combustion chamber fuel behavioral model representing fuel behavior in the combustion chamber;

injection amount calculating means for calculating a fuel injection amount required to adjust an actual gaseous air-fuel ratio in the combustion chamber to a desired value in accordance with the fuel quantity-of-state calculated by the fuel quantity-of-state calculating means; and injection valve actuating means for opening and closing the fuel injection valve on the basis of the fuel injection amount calculated by the injection amount calculating means.

2. The fuel injection control apparatus in accordance with claim 1, wherein the combustion chamber fuel behavioral model includes a cranking model representing fuel behavior during a first period from start-up of engine to an initial explosion and a firing model representing fuel behavior during a second period succeeding the first period, said cranking model being selected in the beginning of the engine starting operation, and being switched to the firing model upon detection of the initial explosion.

3. The fuel injection control apparatus in accordance with claim 2, wherein, if leakage of fuel from the fuel injection valve is detected during a dormant period of the engine, such a leakage amount is reflected to determination of an initial value of the cranking model.

4. The fuel injection control apparatus in accordance with claim 1, wherein the combustion chamber fuel behavioral model takes account of a combustion chamber inflow fuel amount including a fuel amount adhering on a wall of the combustion chamber and a fuel amount vaporized in the combustion chamber.

5. The fuel injection control apparatus in accordance with claim 1, wherein the combustion chamber fuel behavioral model divides a combustion chamber inflow fuel amount $F_o$ into three, a fuel amount $\alpha_d \cdot F_o$ adhering on a wall of a cylinder of the combustion chamber, a fuel amount $\alpha_c \cdot F_o$ adhering on other wall of the combustion chamber and a fuel amount $\beta_c \cdot F_o$ vaporized in the combustion chamber, where $\alpha_d + \alpha_c + \beta_c = 1$.

6. The fuel injection control apparatus in accordance with claim 1, wherein the combustion chamber fuel behavioral model takes account of a combustion chamber adhesion fuel amount $M_c$ including a fuel amount $\gamma_c \cdot M_c$ vaporized in the combustion chamber and a fuel amount $\gamma_e \cdot M_c$ carried over to the exhaust passage.

7. The fuel injection control apparatus in accordance with claim 1, wherein the combustion chamber fuel behavioral model takes account of a gaseous fuel amount residing in the combustion chamber without being burnt in a cranking operation.

8. A fuel injection control apparatus for an internal combustion engine comprising:

a fuel injection valve disposed in a combustion chamber so that fuel is directly injected from the fuel injection valve into the combustion chamber;

operational condition detecting means for detecting various operational conditions including properties of fuel;

fuel quantity-of-state calculating means for calculating a fuel quantity-of-state in the combustion chamber in accordance with the operational conditions detected by the operational condition detecting means, using an atomized fuel behavioral model representing behavior of fuel injected from the fuel injection valve and a combustion chamber fuel behavioral model representing fuel behavior in the combustion chamber; injection amount calculating means for calculating a fuel injection amount required to adjust an actual gaseous airfuel ratio in the combustion chamber to a desired value in accordance with the fuel quantity-of-state calculated by the fuel quantity-of-state calculating means; and injection valve actuating means for opening and closing the fuel injection valve on the basis of the fuel injection amount calculated by the injection amount calculating means.

9. The fuel injection control apparatus in accordance with claim 8, wherein the combustion chamber fuel behavioral model includes a cranking model representing fuel behavior during a first period from start-up of engine to an initial explosion and a firing model representing fuel behavior during a second period succeeding the first period, said cranking model being selected in the beginning of the engine starting operation, and being switched to the firing model upon detection of the initial explosion.

10. The fuel injection control apparatus in accordance with claim 9, wherein, if leakage of fuel from the fuel injection valve is detected during a dormant period of the engine, such a leakage amount is reflected to determination of an initial value of the cranking model.

11. The fuel injection control apparatus in accordance with claim 8, wherein the combustion chamber fuel behavioral model takes account of a combustion chamber inflow fuel amount including a fuel amount adhering on a wall of the combustion chamber and a fuel amount vaporized in the combustion chamber.

12. The fuel injection control apparatus in accordance with claim 8, wherein the combustion chamber fuel behavioral model divides a combustion chamber inflow fuel amount $F_o$ into three, a fuel amount $\alpha_d \cdot F_o$ adhering on a wall of a cylinder of the combustion chamber, a fuel amount $\alpha_c \cdot F_o$ adhering on other wall of the combustion chamber and a fuel amount $\beta_c \cdot F_o$ vaporized in the combustion chamber, where $\alpha_d + \alpha_c + \beta_c = 1$.

13. The fuel injection control apparatus in accordance with claim 8, wherein the combustion chamber fuel behavioral model further takes account of a combustion chamber adhesion fuel amount $M_c$ including a fuel amount $\gamma_c \cdot M_c$ vaporized in the combustion chamber and a fuel amount $\gamma_c \cdot M_c$ carried over to the exhaust passage.

14. The fuel injection control apparatus in accordance with claim 8, wherein the combustion chamber fuel behavioral model takes account of a gaseous fuel amount residing in the combustion chamber without being burnt in a cranking operation.

* * * * *